US008812696B2

(12) United States Patent
Bao et al.

(10) Patent No.: US 8,812,696 B2
(45) Date of Patent: Aug. 19, 2014

(54) EXTENSIBLE MARKUP LANGUAGE DOCUMENT MANAGEMENT METHOD AND SYSTEM

(75) Inventors: Hongqing Bao, Shenzhen (CN); Yang Zhao, Shenzhen (CN); Linyi Tian, Shenzhen (CN); Qian Sun, Shenzhen (CN); Xuefei Song, Shenzhen (CN); Chenghui Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1192 days.

(21) Appl. No.: 11/969,603

(22) Filed: Jan. 4, 2008

(65) Prior Publication Data

US 2008/0104124 A1    May 1, 2008

Related U.S. Application Data

(63) Continuation-in-part of application No. PCT/CN2006/003659, filed on Dec. 29, 2006.

(30) Foreign Application Priority Data

Feb. 10, 2006  (CN) .......................... 2006 1 0033602
May 27, 2006  (CN) .......................... 2006 1 0060886

(51) Int. Cl.
*G06F 15/16* (2006.01)
*G06F 17/00* (2006.01)
*G06F 7/04* (2006.01)

(52) U.S. Cl.
USPC ............................. 709/229; 715/234; 726/21

(58) Field of Classification Search
USPC ............................. 709/229; 715/234; 726/21
See application file for complete search history.

(56) References Cited

U.S. PATENT DOCUMENTS

| | | | |
|---|---|---|---|
| 2005/0143067 A1 | 6/2005 | Van Do et al. | |
| 2005/0255811 A1* | 11/2005 | Allen et al. | ...................... 455/78 |
| 2006/0053208 A1* | 3/2006 | Laurila et al. | ................. 709/206 |
| 2006/0140173 A1* | 6/2006 | Hoover | ......................... 370/352 |
| 2006/0182129 A1* | 8/2006 | Mutch et al. | .................. 370/401 |
| 2006/0235981 A1* | 10/2006 | Westman et al. | ............. 709/227 |

FOREIGN PATENT DOCUMENTS

| | | |
|---|---|---|
| CN | 1618066 A | 1/2005 |
| CN | 1627690 A | 6/2005 |
| CN | 1656482 A | 8/2005 |
| EP | 1462949 A1 | 9/2004 |
| WO | WO 2005/022863 A1 | 3/2005 |

OTHER PUBLICATIONS

Open Mobile Alliance, OMA-TX-XDM_Core_V1_0-20050415-C (Apr. 15, 2005).

(Continued)

*Primary Examiner* — Ranodhi Serrao
(74) *Attorney, Agent, or Firm* — Leydig, Voit & Mayer, Ltd.

(57) ABSTRACT

An Extensible Markup Language (XML) document management method includes: receiving an XML document management operation request sent via an XCAP protocol, by an XML Document Management Server (XDMS); determining that the XML document management operation request is in an entrustment mode, and determining whether to perform an operation described in the XML document management operation request in accordance with access permission information corresponding to an XML document, by the XDMS.

13 Claims, 6 Drawing Sheets

(56) References Cited

OTHER PUBLICATIONS

Open Mobile Alliance, "Shared XDM Specification," p. 1-18 (Jan. 10, 2006) http://www.openmobilealliance.org/Technical/release_program/docs/XDM/V1_0-20060110-C/OMA-TS-XDM_Shared-V1_0-20060110-C.pdf.

Open Mobile Alliance, "XML Document Management (XDM) Specification," p. 1-52 (Jan. 10, 2006) http://www.openmobilealliance.org/Technical/release_program/docs/XDM/V1_0-20060110-C/OMA-TS-XDM_Core-V1_0-20060110-C.pdf.

Open Mobile Alliance, "XML Document Management Architecture," p. 1-19 (Jan. 10, 2006) http://www.openmobilealliance.org/Technical/release_program/docs/XDM/V1_0-20060110-C/OMA-AD-XDM-V1_0-20060110-C.pdf.

Open Mobile Alliance, "XML Document Management Requirements," p. 1-50 (Mar. 17, 2005) http://openmobilealliance.org/Technical/release_program/docs/XDM/V1_0-20050628-C/OMA-RD-XDM-V1_0-20050317-C.pdf.

European Patent Office, Extended European Search Report in European Patent Application No. 06840689.1 (Feb. 2, 2009).

European Patent Office, First Examination Report in European Patent Application No. 06840689.1 (May 12, 2009).

European Patent Office, Second Examination Report in European Patent Application No. 06840689.1 (Sep. 10, 2009).

State Intellectual Property Office of the People's Republic of China, International Search Report in International Patent Application No. PCT/CN2006/003659 (Apr. 5, 2007).

1st Office Action from the Chinese Patent Office in corresponding Chinese Patent Application No. 200610033602.2 (Nov. 7, 2008).

2nd Office Action from the Chinese Patent Office in corresponding Chinese Patent Application No. 200610033602.2 (Sep. 4, 2009).

Rosenberg, "The Extensible Markup Language (XML) Configuration Access Protocol (XCAP)," Oct. 24, 2005, pp. 1-66, The Internet Society, Geneva, Switzerland.

Rosenberg et al., "A Document Format for Expressing Privacy Preferences," Oct. 23, 2005, pp. 1-42, The Internet Society, Geneva, Switzerland.

\* cited by examiner

EXTENSIBLE MARKUP LANGUAGE DOCUMENT MANAGEMENT METHOD AND SYSTEM

CROSS-REFERENCE TO RELATED APPLICATIONS

This application is a continuation-in-part application of International Application No. PCT/CN2006/003659, filed Dec. 29, 2006, which claims the benefits of Chinese patent application numbers 200610033602.2 filed Feb. 10, 2006 and 200610060886.4 May 27, 2006 respectively, contents of which are incorporated herein by reference in their entireties.

FIELD OF THE INVENTION

The present invention relates to the field of information technology, particularly to Extensible Markup Language XML document processing, and more particularly to an Extensible Markup Language XML document management method and system.

BACKGROUND OF THE INVENTION

An Extensible Markup Language (XML) Document Management (XDM) system is a universal enabler for various communication services, and is capable of storing and managing the data of various services. The Open Mobile Alliance (OMA) has established a preliminary specification for the XDM system. The XDM system has mainly the following functions.

1. An XDM Client (XDMC): The XDM client is an entity providing an access to XDM server. The XDM client may be a terminal or server entity. A resource of the XML Configuration Access Protocol (XCAP) corresponds to an XML document, or an element or an attribute in an XML document. The XCAP resource is identified by an XCAP URI. The XDM client makes use of an XML document through XCAP operations, and shall construct a URI of a resource on which an operation is requested, based upon a use method of an application. The following operations may be performed: creation or replacement of a document, deletion of a document, retrieval of a document, creation or replacement of an element, deletion of an element, retrieval of an element, creation or replacement of an attribute, deletion of an attribute, or retrieval of an attribute. For details of the XCAP protocol, a reference can be made to the specification of "The Extensible Markup Language (XML) Configuration Access Protocol" of the Internet Engineering Task Force.

2. An XDM Server (XDMS): A shared XDM server provides the functions of operation authentication, XML document management, XML document change notification, etc. For instance, the shared XDM server stores URI list documents shared by users, and a URI list includes a group, an acceptance list, a denial list, etc. as reused by different service enablers.

3. An aggregation proxy: A contact point where the XDM client can at the user equipment access XML documents on the XDM server is referred to as an aggregation proxy. Typically, a service enabler server can access the XDM server via no aggregation proxy. The aggregation proxy provides the following functions: 1) authentication of the XDM client; 2) routing of an XCAP request to a proper XDM server; and 3) compression/decompression at a wireless interface.

In the existing solution, a person who requests for a management operation on an XML document can only be the owner of the document per se. A user may perform various operations allowed, by the XDM system, such as deletion and modification, on his owned XML document, but can not perform any operation on a document of another user. As illustrated in FIG. 1, a typical XDM system mainly consists of the following devices.

An XDM client: the XDM client is an entity with an access to an XDM server, and may be a terminal or server. The XDM client as being a terminal interacts with the XDM server through an aggregation proxy; otherwise the XDM client interacts directly with the XDM server. The XDM client manages an XML document stored on an XDM server via the XCAP protocol.

The Aggregation proxy: If the XDM client is a terminal, an XCAP request of the XDM client is forwarded to a proper XDM server through the aggregation proxy; and main functions of the aggregation proxy include routing, authentication, compression, etc.

The XDM server: the XDM server stores and manages XML documents for multiple XDM clients, and provides a notification message for a client which subscribes for a change to some documents if these documents are changed.

However, for an operation on a document stored on the XDM server, this system only allows the operation to be performed by a client representing the owner of the document, but another entity such as another user or an application server can not be entrusted with the operation on the XML document, which brings inconvenience to users. In many cases, an entrustment-proxy mechanism is required to allow a client to entrust its operations on an XML document, such as storage and management, with a client of another user, i.e., this client allows the XDM client of another user to manage the XML document of this client. No mechanism for an access control on an XML document has been provided in the prior art.

SUMMARY OF THE INVENTION

An embodiment of the invention provides an XML document management method including the processes of:

receiving an XML document management operation request sent via an XCAP protocol, by an XML Document Management Server (XDMS);

determining that the XML document management operation request is in an entrustment mode, and determining whether to perform an operation described in the request in accordance with access permission information corresponding to an XML document, by the XDMS.

An embodiment of the invention provides another XML document management method including the processes of:

receiving an XML document management operation request sent via XCAP protocol, by an XML Document Management Server (XDMS);

checking whether an identity identifier of the XDMC matches an identity identifier of an owner of a document on which an operation is requested, by the XDMS;

performing, by the XDMS, the operation requested by the XDMC; otherwise authenticating, by the XDMS, in accordance with access permission information corresponding to the XML document to determine whether to perform the operation requested by the XDMC, if the identity identifier of the XDMC matches the identity identifier of the owner of the document on which the operation is requested.

An embodiment of the invention further provides an XML document management system including an XML Document Management Client and an XML Document Management Server, where the system further comprises an XML document management operation entrustment checking element and a processing element, the checking element is adapted to validate whether an XML document operation requested by the XML Document Management Client is in an authorized entrustment mode;

the processing element performs a specific management operation on an XML document in accordance with an entrustment authorization rule if the checking element determines an authorized entrustment mode.

Access permission information of the XML document is set in the system, and in accordance with the access permission information, the XDMS determines whether a specified entity is provided with a privilege of performing an XDM operation on the XML document.

Preferably, in accordance with the access permission information of the XML document, the XDMS authenticates an operation request sent from an XDMC other than an owner of the document on which the operation is requested, and determines whether to perform the operation requested by the XDMC.

An embodiment of the invention further provides an XML document management server including an XML document management operation entrustment checking element and a processing element;

the checking element is adapted to check whether an XML document management operation requested by an XML Document Management Client is in an entrustment mode;

the processing element performs a specific management operation on an XML document in accordance with an entrustment authorization rule if the checking element determines an authorization entrustment mode.

An embodiment of the invention provides another XML document management method including the processes of:

receiving, by an XML Document Management Server XDMS, a management operation request, which is sent from an XML Document Management Client (XDMC), for an XML document or a specific part thereof;

obtaining, by the XDMS, from the request, information on the identity identifier of the XDMC, and determining whether to perform the operation requested by the XDMC corresponding to the identity identifier in accordance with access permission information corresponding to the XML document.

In the embodiments of the invention, the implementation of entrustment authorization for an XDMC client other than the owner of an XML document enables an entrustment management operation on the XML document, and makes the management operation on the XML document more flexible and convenient. Also, the use of Access Permission information of the XML document for a control on an entrusted access ensures security of the access to the XML document of a user.

Due to the entrustment management enabled on an XML document, sharing of the XML document can be enabled effectively.

An XDMC client which satisfies an XML document access condition can perform a specified operation on a specific part of the XML document, thereby enabling an accurate access control on the XML document.

BRIEF DESCRIPTIONS OF THE DRAWINGS

Drawings provided here are intended to provide further understanding of the invention, and constitute a part of this application. Illustrative embodiments and descriptions of the invention are intended to explain but not to limit the invention. In the drawings.

DETAILED DESCRIPTION OF THE INVENTION

Embodiments of the invention are described as follows with reference to the drawings.

Figure 1:
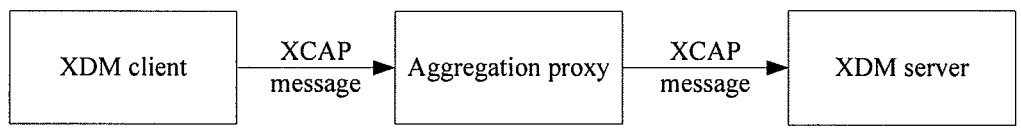
FIG. 1 is a schematic diagram of an XML document management system in the prior art.
Figure 2:
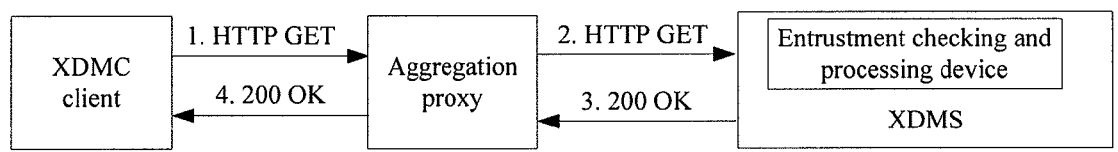
FIG. 2 is a schematic diagram of an XML document management system according to an embodiment of the invention.

As illustrated in FIG. 2, an embodiment of the invention provides an XML document management system. The XML document management system includes an XML Document Management Client (XDMC) delegate, an aggregation proxy and an XML Document Management Server (XDMS). A n entrustment checking and processing device is connected with the XDMS, and subscription/notification messages between the XDMC delegate and the aggregation proxy, between the aggregation proxy and the entrustment checking and processing device, as well as between the aggregation proxy and the aggregation proxy, are implemented through SIP/IP Core.

The XDMC delegate sends an XCAP request to the aggregation proxy, and the aggregation proxy forwards the XCAP request to the XDMS. The entrustment checking and processing device in the XDMS verifies whether the XML document operation request is in an authorized entrustment mode, and performs a processing corresponding to the XML document management operation requested by the XDMC. The XDMS sends a response message to the aggregation proxy, and the aggregation proxy returns the response message to the XDMC delegate.

The entrustment checking and processing device may include: an entrustment checking module adapted to check whether an XML document management operation requested for by the XML document management client is in an entrustment mode, and an authorization processing module adapted to determine whether the entrustment mode determined by the entrustment checking module is an authorized entrustment mode, and to perform a specific management operation on a specific part of an XML document in accordance with an entrustment authorization rule if the entrustment mode is an authorized entrustment mode.

The above document management system may also include an XML document owner client. The XML document owner client is an XML document management client, which is actually an XML document owner and is connected with the XDMS. The XML document owner client establishes and sends entrustment authorization rules to the XDMS, and the XML document owner client authorizes the XDMC delegate to perform prescribed management operations on a specific part of an XML document in accordance with an entrustment authorization rule.

Alternatively, the entrustment authorization rule document may be established, stored and enforced by the XDMS.

Each of the entrustment authorization rules includes: a requestor identification field for identifying the sender of an XML management operation request corresponding to the entrustment authorization rule, an operation object field for identifying an XML document corresponding to the XML management operation or a specific element or attribute in the XML document, an operation type field for identifying the type of the XML management operation, and an action field for identifying an action to be adopted by the server upon a rule match.

The XDM entrustment authorization rules are stored in an XML document. The XML document includes several XDM entrustment authorization rules, each of which specifies who can be a delegate for an entrusting party to perform which operations on which element(s) in a corresponding document.

The XDM entrustment authorization rule document can be in a format with an architecture similar to that of the existing mechanism (see the reference document [COMMONPOL]). The entrustment authorization document includes a root element of <ruleset> including several sub-elements of <rule>. Each of the sub-elements of <rule> represents a rule. Each sub-element of <rule> includes three elements of <condition>, <action> and <transformation>. The element of <condition> determines a validation condition for a rule. The element of <action> determines an action to be adopted when a rule is matched, such as allowing, denial, and required confirmation. The element of <transformation> indicates information processing, and is used here to specify contents of an XML document.

The element of <condition> mainly includes:

A) Identity: a marker of a user identity, such as sip: zhangsan@huawei.com

B) Domain: a domain, such as @example.com

C) Validity: a period of validity, such as 2005-8-1 8:00~2005~8-9 18:00

D) Sphere: a location, such as home, work

An extension to the element of <action> is as follows:

The element of <action> includes but is not limited to at least one of:

an element of <get>, which defines an action on a GET operation;

an element of <put>, which defines an action on a PUT operation;

an element of <delete>, which defines an action on a DELETE operation;

an element of <post>, which defines an action on a POST operation.

These actions may include "allow", "deny" and "confirm", which indicate allowing, denial and required confirmation respectively.

The element of <transformation> includes several sub-elements of <xpath>, and the value of the element <xpath> is an XPATH expression. These elements of <xpath> have a logical OR relationship, and specify those parts of an XML document accessible by a user.

Alternatively, the entrustment authorization rule document may be of another structure:

Similarity to [COMMON_POLICY], the entrustment authorization rule document includes a root element of <ruleset> including several elements of <rule>.

Each of the elements <rule> includes three sub-elements of <condition>, <action> and <transformation>.

Based on this, the present embodiment adds a sub-element of <method> in the element of <condition>, and the value of the element <method> includes but is not limited to at least one of GET, PUT and DELETE; and a sub-element <xpath> is added in the element of <transformation>, indicating that which XML parts are controlled under an entrustment authorization rule. The value of the sub-element <xpath> is an XPATH expression. The element of <transformation> may include several sub-elements of <xpath>, and a union set of parts of an XML document described by these elements of <xpath> indicates that which parts of the XML document are controlled under the entrustment authorization rule.

In the embodiment of the invention, the XML document management system includes an XML document management client (XDMC), an aggregation proxy and an XML document management server (XDMS).

The XDMC sends an XCAP request for operating an XML document to the aggregation proxy, and the aggregation proxy forwards the XCAP request to a corresponding XDMS. The XDMS verifies whether the XCAP request for operating an XML document is in an entrustment mode, and performs the XML document management operation requested by the XDMC if the XCAP request is a request sent from an owner of the XML document or authentication of the entrustment mode is passed. Then, the XDMS sends a response message to the aggregation proxy, and the aggregation proxy returns the response message to the XDMC.

In the above procedure, when the XDMS checks whether the XCAP request for operating an XML document is in an entrustment mode, the identifier of the sender of the XCAP request is firstly obtained.

If the system is implemented with a 3GPP IMS network, the XDMS obtains the identifier of the sender of the XCAP request from the field of X-3GPP-Asserted-Identity (or X-3GPP-Intended-Identity) in the head of the XCAP request; otherwise when the XCAP request is transmitted through the aggregation proxy, the aggregation proxy inserts the identifier of the sender into the field of X-3GPP-Asserted-Identity in the head of the XCAP request, and the XDMS obtains the identifier of the sender from the field of X-3GPP-Asserted-Identity in the head of the XCAP request.

The XDMS may also include an entrustment checking module and an entrustment authorization module. The entrustment checking module is adapted to check whether the identity identifier of the XDMC which sends the XCAP request for operating an XML document is the identity identifier of the owner of the XML document. Specifically, the identity identifier of the XDMC which sends the XCAP request for operating an XML document is obtained from the request message sent from the XDMC, and the identity identifier of the document owner is obtained from the XML document, and then they are compared with each other. If they match, then the operation is allowed; otherwise it is determined as being in an entrustment mode, and the entrustment authentication module shall be responsible for processing. The entrustment authentication module is adapted to determine whether the operation request has been authorized in accordance with access permission information of a target document, and if the authentication is passed, then the XDMS performs the operation requested by the XDMC; otherwise denies the request.

The access permission information of the XML document is set at the XDMC of the XML document owner, and is sent to the XDMS by the XDMC of the XML document owner. The access permission information is adapted to authorize an XDMC corresponding to a non-document owner for performing an operation on an XML document or a specific part of the XML document. An owner of a document is typically a creator of the document. The identity identifier of the owner of the document may typically be stored in a XML document created by it.

The access permission information includes information on several permission rules of accessing a document. Each rule describes who can perform which operations on which element(s) in the document. Each rule includes a requestor identity identification condition field which shall be satisfied by an identity identifier of a corresponding XML management operation requester corresponding to the rule; an operation object field for identifying an XML document corresponding to the XML management operation or a specific element or attribute therein; an operation type field for identifying a type of the XML management operation; and an action field for identifying an action to be adopted by the server upon a rule match.

The XDM access permission information may be described via XML, and includes a root element of <ruleset> including several sub-elements of <rule>, each of which represents a permission rule. Each element of <rule> includes three elements of <condition>, <action> and <transformation>. The element of <condition> indicates a validation condition for the present rule, the element of <action> indicates an action to be adopted when the present rule is validated, such as allowing, denial, required confirmation, etc., and the element of <transformation> may specify a specific content part of an XML document to which an access is required.

The element of <condition> can include:

A) Identity: an identifier of a user identity, such as sip: zhangsan@huawei.com

B) Domain: a domain, such as @example.com

C) Validity: a period of validity, such as 2005-8-1~8: 00~2005-8-9 18:00

D) Sphere: a location, such as home, work

<action> mainly includes:

The element of <action> includes but is not limited to at least one of:

an element of <get> defines an action on a GET operation;
an element of <put> defines an action on a PUT operation;
an element of <delete> defines an action on a DELETE operation;
an element of <post> defines an action on a POST operation;
an element of <suspend> defines an action on a suspension operation;
an element of <resume> defines an action on a recovery operation;
an element of <subscribe> defines an action on a document change subscription operation.

Values of these actions may include "allow", "deny" and "confirm", which indicate allowing, denial and required confirmation respectively.

The element of <transformation> includes several sub-elements of <xpath>, and a value of the element <xpath> is an XPATH expression. These elements of <xpath> have a logical OR relationship, and specify a part of an XML document accessible by a user.

Further, the access permission information document may be in another structure:

The document includes a root element of <ruleset> including several elements of <rule>.

The elements of <rule> include three sub-elements of <condition>, <action> and <transformation>.

Based upon this, the present embodiment adds a sub-element of <method> in the element of <condition>, and a value of the element <method> includes but is not limited to at least one of GET, PUT, DELETE, POST, SUSPEND, RESUME and SUBSCRIBE; and the element of <transformation> includes a sub-element <xpath> that indicates which XML part is controlled under the present rule and has a value of an XPATH expression. The element of <transformation> can include several sub-elements of <xpath>, and a union set of parts of an XML document described by these elements of <xpath> indicates which parts of the XML document are controlled under the rule.

The First Embodiment

Figure 3:
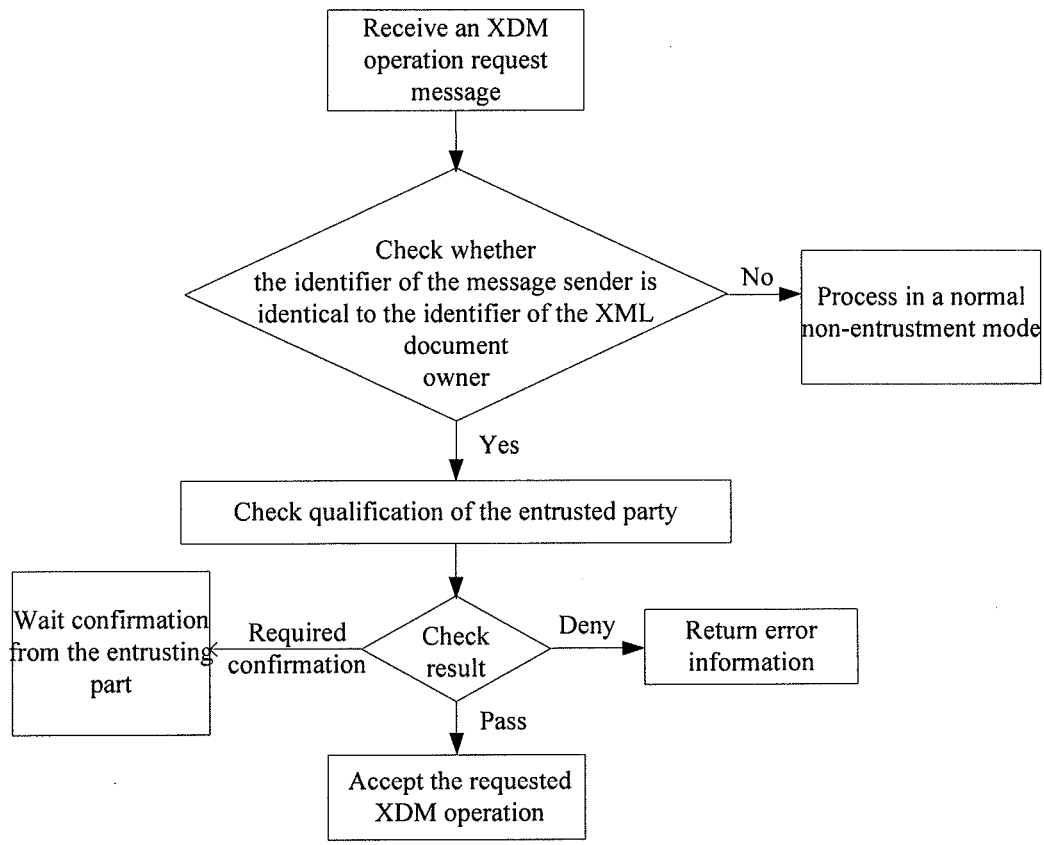
FIG. 3 is a flow chart of XML document entrustment management operations according to a first embodiment of the invention.

FIG. 3 is a flow chart of XML document entrustment management operations according to another embodiment of the invention.

As illustrated in FIG. 3, the XDMS makes an entrustment mode determination upon receipt of an XDM operation request, and checks whether the identity identifier of the message sender matches the identity identifier of the owner of the document to be operated. If they match, then it is determined as being a normal mode, otherwise an entrustment mode. In the case of a normal mode, processing continues as in the prior art; and in the case of an entrustment mode, the access permission information of the requested document is obtained, and a corresponding operation is performed in accordance with the access permission information.

Description of various rules in an XDM entrustment authorization document will be explained below by way of an example.

It is assumed that the identity identifier of an entrusting party userA is sip:userA@example.com, and the identity identifier of an entrusted party B is sip:userB@example.com. It is assumed that the entrusting party userA stores the following XML document in the XDMS:

http://xcap.example.com/services/resource-lists/users/sip:userA@example.com/friends.xml

```
<?xml version="1.0" encoding="UTF-8"?>
<resource-lists xmlns="urn:ietf:params:xml:ns:resource-lists">
    <list name="My-Close-friends">
        <entry uri="sip:Andy@example.com">
            <display-name>Andy</display-name>
        </entry>
        <entry uri="sip:Simon @example.com">
            <display-name>Simon</display-name>
        </entry>
    </list>
    <list name=" My_Middle_School_Classmates">
        <entry uri="sip:friend1@example.com">
            <display-name>Friend1</display-name>
        </entry>
        <entry uri="sip:friend2@example.com">
            <display-name>Friend1</display-name>
        </entry>
        <entry uri="sip:friend3@example.com">
            <display-name>Friend1</display-name>
        </entry>
    </list>
</resource-lists>
```

The XML document describes two lists of the entrusting party userA, one of which is named "My-Close-Friends", and the other of which is named "My-Middle-School-Classmates". It is assumed that the userA allows the entrusted party userB to read or modify contents in the list "My-Middle-School-Classmates", then:

1) An sub-element of <identity> in the element of <condition> is:

```
<identity>
    <one id="userB@example.com" scheme="sip"/>
</identity>
```

2) The element of <transformation> includes the following sub-elements:

```
<xpath>
/resource-lists/list[@name=" My_Middle_School_Classmates "]
</xpath>
```

3) The element of <action> is:

```
<operation>
    <get>allow</get>
    <put>deny</put>
    <delete>deny</delete>
</operation>
```

Rules in corresponding access permission information are as follows:

The element of <condition> includes an identifier of the userB, which indicates that the rule is applicable when the message sender is userB;

The element of <action> includes four sub-elements: the first one indicates allowing a read (GET) operation, the second one indicates prohibiting a write (PUT) operation, the third one indicates prohibiting a deletion (DELETE) operation, and the fourth one indicates prohibiting a POST operation.

The element of <transformation> includes an element of <xpath>, which specifies, with an XPATH expression, which part of a corresponding XML document on which an operation applies the present rule. Here, the rule is applicable to an operation on the list of "My_Middle_School_Classmates" in the corresponding XML document.

```
<ruleset xmlns="urn:ietf:params:xml:ns:common-policy">
    <rule id="f3g44r3">
        <condition>
            <identity>
                <oneid=="userB@example.com" scheme="sip"/>
            </identity>
        </condition>
        <action>
            <get>allow</get>
            <put>deny</put>
            <delete>deny</delete>
            <post>deny</post>
        </action>
        <transformation>
            <xpath>/resource-lists/list[@name="
            My_Middle_School_Classmates
"]
            </ xpath >
        </transformation>
    </rule>
</ruleset>
```

In entrustment mode determination, whether to be an entrustment mode may be indicated by adding a flag field in the XCAP message. The flag field is placed in the head of a message. Upon receiving the message, the XDMS obtains this flag field, and thereby determining whether to be an entrustment mode.

The Second Embodiment

Figure 4:
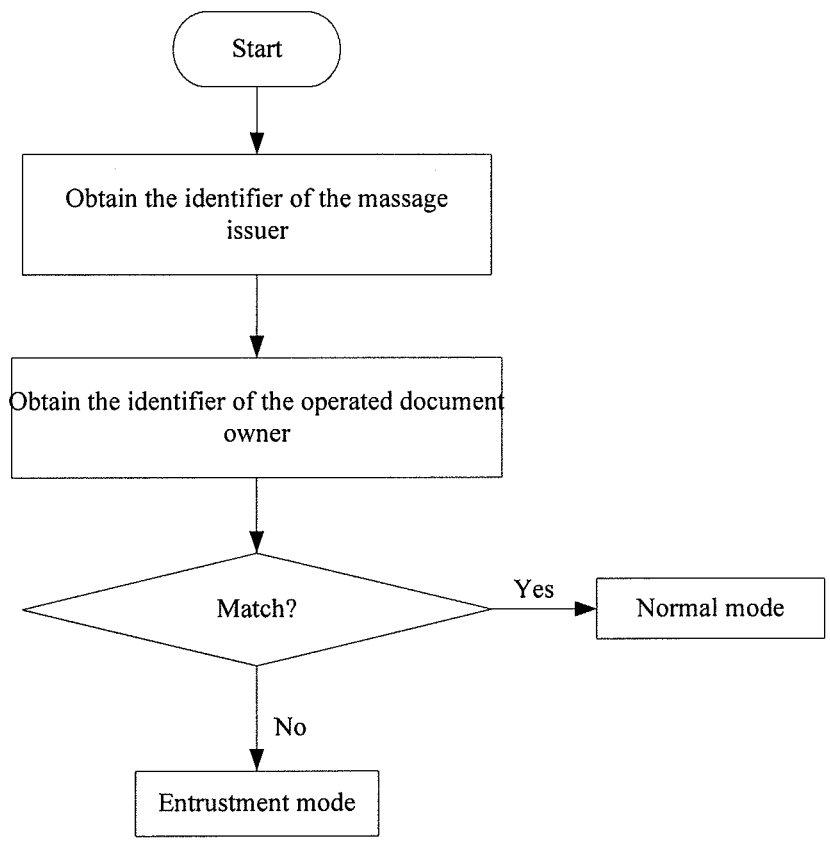
FIG. 4 is a flow chart of checking an entrustment mode in an XML document management method according to a second embodiment of the invention.

FIG. 4 is a flow chart of checking an entrustment mode. As illustrated in FIG. 4, the procedure includes obtaining the user identity identifier of a message issuer; obtaining the identifier of the owner of a document on which an operation is requested; if the above identifiers match, then determining as being a normal mode; otherwise determining as being an entrustment mode.

Further, in a operation performed in accordance with the access permission information, the following operation mode can be involved: the XDMS sends information relevant to the identity identifier of the XML document management client to the XML document owner client for confirmation, and upon confirmation, the XML document owner client returns confirmation information to the XDMS; if a confirmation result is authorization, then the XML document management server performs a requested operation; otherwise denies performance of the requested operation.

In the above solution, it is the situation that the XDMC of an entrusting party or an entrusted part is located in a user equipment, such as a mobile phone or a computer, unless stated otherwise. Further, regardless of an entrusting party or an entrusted part, when its XDMC is located in an application server, a request can be sent directly to an XDMS other than through an aggregation proxy; and when its XDMC is located in a user terminal, a request can be forwarded to an XDMS through an aggregation proxy.

The Third Embodiment

Figure 5:
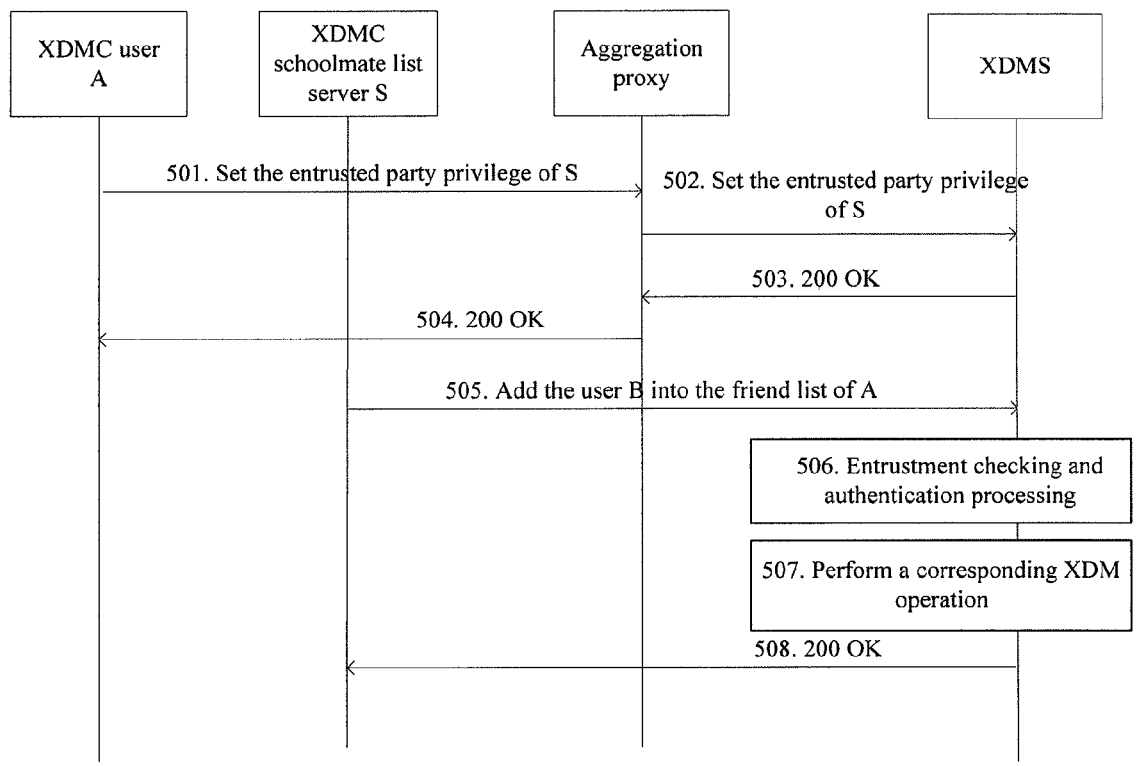
FIG. 5 is a messaging flow chart in an XML document management method according to a third embodiment of the invention.

FIG. 5 is a messaging flow chart of an XML document management method according to the third embodiment of the invention.

The user A entrusts a schoolmate list server S with maintenance of his friend information. When a classmate B of the user A joins the schoolmate list of a class to which the user A belongs, the server maintains for the user A a friend list stored in an XDMS by adding the user B into the friend list.

Referring to FIG. 5, a messaging flow chart of the XML document management method is as follows.

In process 501, the XDMC of the user A sends an XCAP message to the aggregation proxy, and sets access permission information for the schoolmate list server S in its XDMS which stores the friend list, thereby allowing the schoolmate list server to add a friend into its friend list "My Classmates".

In process 502, the aggregation proxy forwards the XCAP message to a XDMS server.

In process 503, the XDMS server sets the access permission information of the user A, and returns an operation success response message to the aggregation proxy.

In process 504, the aggregation proxy sends the operation success response message to the XDMC client of the user A;

In process 505, after adding the user B into the schoolmate list of the class to which the user A belongs, the schoolmate list server S sends to the XDMS an XDM operation request for adding the user B into the friend list of the user A.

In process 506, the XDMS performs the flow of entrustment mode determination, i.e. the XDMS obtains from the message the identifier of the message issuer, (i.e. the schoolmate list server S) and the identifier of the owner of the operation object, compares the identifier of the message issuer with the identifier of the owner of the operation object, and determines an entrustment mode in accordance with a comparison result.

In process 507, the XDMS determines that the schoolmate list server S is authorized to be a delegate of the user A to perform the XDM operation, in accordance with the identifier of the message issuer, the operation object and an operation type, which are obtained from the message, with reference to permission rule information in the access permission information stored in the XDMS, and then adds the user B as a friend into the friend list of the user A.

In process 508, the XDMS sends an operation success response message to the schoolmate list server.

In the process 501, the user A sends the following message to the corresponding XDMS when setting the access permission information on the XDMS:

```
PUT http://xcap.example.com/services/resource-lists/users/
sip:userA@example.com/friends.xml/ruleset/rule HTTP/1.1
    ...
    Content-Type: application/xcap-el+xml
    Content-Length: (...)
    <rule id="ck81">
        <conditions>
            <identity>
                <id>sip:alumin@exampleservice.com</id>
            </identity>
        </conditions>
        <actions>
            <get>allow</get>
            <put>allow></put>
            <delete>deny</delete>
        </actions>
        <transformations>
            <xpath>
                /resource-lists/list[@name="My_Middle_School_Classmates"]
            </xpath>
        </transformations>
    </rule>
```

The element of <rule id=ck81> indicates a permission rule, and includes three sub-elements. <conditions> indicates conditions in which the rule is applicable, i.e. the present rule is applicable when the message requester is the schoolmate list server indicated in the element of <id>. The element of <action> indicates an action of the XDM server when the rule is applicable, where the first sub-element indicates allowing a GET operation, the second sub-element indicates allowing a PUT operation, and the third sub-element indicate disallowing a DELETE operation. It shall be noted that whether to allow a POST operation has not been specified, and in practice, the XDM server can be provided with a default action which as typically used here is denial, i.e. the server denies performance of an undefined operation. The element of <transformations> indicates the operation object of the operation under the present rule, which is here the list named "My_Middle_School_Classmates" in the corresponding XML document.

It is assumed that the SIP address of the schoolmate list server S is sip:alumni@exampleservice.com, and the XCAP URI corresponding to the access permission information of the user A is http://xcap.example.com/services/resource-lists/users/sip:userA@example.com/friends.xml/ruleset.

Particularly, the sip:alumni@exampleservice.com is the identity identifier of an authorized object, and indicates that the access permission information defines an access control on the schoolmate list server; <get>allow</get> indicates allowing the schoolmate list server to read; <put>allow</put> indicates allowing the schoolmate list server to perform a PUT operation; <delete>deny</delete> indicates disallowing the schoolmate list server to perform a DELETE operation; xpath>/resource-lists/list[@name="My_Middle_School_Classmates"]</xpath> indicates allowing the schoolmate list server to operate the list of My_Middle_School_Classmates. Upon reception of the message, the corresponding XDMS creates XDM access permission condition information.

In the process 505, the message sent by the schoolmate list server when adding the user B into the friend list of the user A is:

```
PUT http ://xcap.example.com/services/shared-lists/users/
sip:userA@example.com/friends.xml/~~/resource-lists/
list%5b@name=%22My_friends%22%5d/entry HTTP/1.1
    ...
    Content-Type: application/xcap-el+xml
    Content-Length: (...)
```

-continued

```
<entry uri="sip:friend2@example.com">
    <display-name>Friend2</display-name>
</entry>
```

The XDMS obtains from this message the identity identifier of the message issuer, "sip:alumni@example service.com", and the identity identifier of the owner of the document on which an operation is requested, "sip:userA@example.com", compares the two identity identifiers, a result of which is different identifiers, and determines that the XDM operation request is in an entrustment mode. Then, the XDMS determines that the schoolmate list server S is authorized for performing this operation by referring to the XDM access permission information set in the process 1), and then performs the XDM operation. Further, if the schoolmate list server S is located in the same LAN or trusted network as the XDMS operator, then communication therebetween may be through no aggregation proxy.

Further, upon reception of the request message, the XDMS may determine that the operation can be performed, directly in accordance with the XML document access permission information without determining whether the identity identifier of the XDMC matches the owner of the document, which includes the following: the XDMS determines whether the XML document access client requesting for accessing the XML document satisfies an XML document access permission condition, and if yes, then performs the requested management operation on the XML document or a specific part of the XML document; otherwise denies the requested operation. The access permission offers with default the owner of the document all operation privileges.

Further, an instant confirmation way may be adopted so that relevant information of the XML document access client requesting for an access operation on the XML document and information on the requested operation is sent simultaneously to the XML document owner client for confirmation, and confirmation information returned from the XML document owner client is received. If the confirmation result is to allow the operation, then the XDMS performs the requested operation; otherwise denies performance of the operation.

The XML document access permission condition may include but not be limited to one of the following items: the condition of the identity identifier of the XML document access client, the condition on a prescribed period of validity, the condition of location information of the requester, etc. such as Identity, Domain, Validity, and Sphere listed in the first embodiment. A specified specific part of the XML document may be also included, and may be XPATH identified. The XML document access client which satisfies the XML document access condition can perform a requested operation on the XML document or the specific part of the XML document. An access operation which can be performed may be a read operation of HTTP GET, a write operation of HTTP PUT, a deletion operation of HTTP DELETE, a retrieval operation of HTTP POST, etc. After successfully performing of the operation, the XDMS sends performance result information to the XML document access client XDMC.

The Fourth Embodiment

The user A authorizes the user B for an access operation on the XML document friends.xml by setting through the XDMC client A the access permission information in the XML document friends.xml on the XDMS. The user B sets for the user A the friend list in the XML document friends.xml through the XDMC client B.

Figure 6:
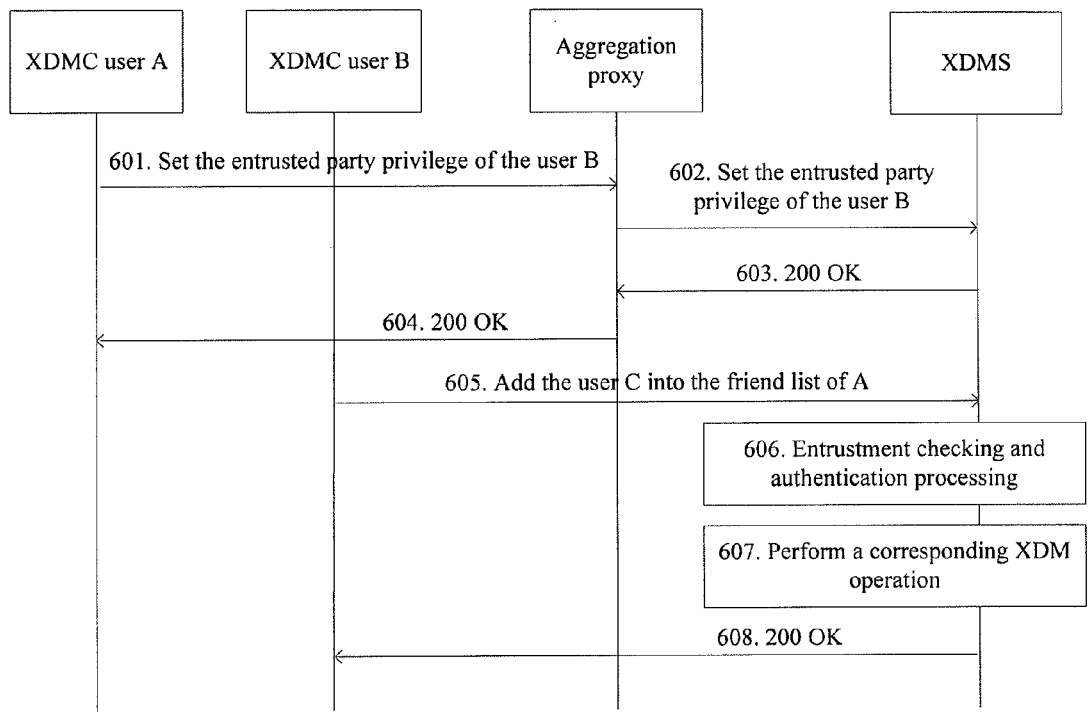
FIG. 6 is a messaging flow chart in an XML document management method according to a fourth embodiment of the invention.

As illustrated in FIG. 6, a messaging flow chart in the fourth embodiment of the invention will be described below.

601: The user A logs in the XDMC client A, sets access permission information of the document friends.xml owned by the user A, and sends the access permission information to the aggregation proxy via an HTTP PUT message.

602: The aggregation proxy forwards the HTTP PUT message to the XDMS.

603: The XDMS set the access permission information of the XML document friends.xml, and returns to the aggregation proxy a response message indicative of a success of the operation.

604: The aggregation proxy sends the response message to the XDMC client A.

605: The user B logs in the XDMC client B, and sends through the aggregation proxy to the XDMS a request message requesting for setting the friend list in the XML document owned by the user A.

606: Upon reception of the request message for setting the friend list, the XDMS obtains the identifier of the message requester and the identifier of the owner of the requested target XML document, and determines that the two identifiers do not match, thereby determining that the request is in an entrustment operation mode. The XDMS performs an authorization check in accordance with the access permission information of the target XML document.

607: The XDMS performs the requested operation after the check is passed.

608: The XDMS sends performance result information to the XDMC client B through the aggregation proxy.

In the above process (1), the request message is:

```
PUT/services/resource-lists/users/sip:userA@example.com/friends.xml/ruleset HTTP/1.1
...
Content-Type: application/xcap-el+xml
Content-Length: (...)
<ruleset xmlns="urn:ietf:params:xml:ns:common-policy">
<rule id="ck61">
    <conditions>
        <identity>
            <id>sip:useB@example.com</id>
        </identity>
    </conditions>
    <actions>
        <get>allow</get>
        <put>allow></put>
        <subscribe>allow</subscribe>
```
    </actions>
</rule>
</ruleset>
```

In the above message, the sub-element <identity> of the element <condition> indicates that the authorized object is the user B; the sub-element <get>allow</get> of the element <actions> indicates allowing the user B to perform an HTTP GET operation on the XML document friends.xml; the sub-element <put>allow</put> of the element <actions> indicates allowing the user B to perform an HTTP PUT operation on the XML document friends.xml;

The sub-element <subscribe>allow<subscribe> of the element <actions> indicates allowing the user B to perform a change subscription operation on the XML document friends.xml. Other default operations that are not specified in the element of <action> are not allowed.

In the process 605, the message sent by the XDMC client B is particularly:

```
PUT
/services/resource-lists/users/sip:userA@example.com/friends.xml/~~/
resource-lists/list%5b@name=%22My_Friends%22%5d/
    HTTP/1.1
Content-Type: application/xcap-el+xml
Host: xcap.example.com
<list name="My_Friends">
    <entry uri="sip:john@example.com">
        <display-name>John Smith</display-name>
    </entry>
    <entry uri="sip:nancy@example.com">
        <display-name>Nancy Cliton</display-name>
    </entry>
    <entry uri="sip:tom@example.com">
        <display-name>Tom Cruise</display-name>
    </entry>
</list>
```

In other words, addition of information on three friends is requested. In the process 606, the XDMS obtains from the request message the identifier of the message requester, sip:userB@example.com, and obtains the identifier of the owner of the requested target document, sip:userA@example.com. Since the two identifiers do not match, an authorization check is performed on the requestor user B in accordance with the access permission information set in the process (1). In accordance with the access permission rule in the check permission information, the XDMS determines that the requester user B possesses privileges of reading, creating, modifying, etc. the requested target document friends.xml, and thus allows performance of the requested operation.

In the process 607, in accordance with the result in the process 606, the XDMS performs the requested operation by adding the friend list specified in the message into the document friends.xml of the user A as the owner.

The foregoing embodiments are intended to describe and explain the principle of the invention. It will be appreciated that embodiments of the invention shall not be limited to these embodiments. It is apparent to those skilled in the art that various modifications and variations made without departing from the spirit and scope of the invention shall be encompassed in the claimed scope of the invention. Accordingly, the claimed scope of the invention shall be defined by the accompanying claims.

The invention claimed is:

1. An Extensible Markup Language (XML) document management method, comprising:

receiving an XML document management operation request sent via an XML Configuration Access Protocol (XCAP) protocol, by an XML Document Management Server (XDMS);

determining that the XML document management operation request is in an entrustment mode, by the XDMS, the entrustment mode allowing a client to entrust its management operation on an XML document to another client; and determining whether to perform an operation described in the XML document management operation request in accordance with access permission information corresponding to an XML document, by the XDMS, wherein the access permission information is stored in an XML document of the XDMS;

wherein the process of determining that the XML document management operation request is in the entrustment mode comprises:

obtaining an identity identifier of an XML Document Management Client (XDMC) sending the XML document management operation request and the identity identifier of the owner of the XML document, in accordance with the XML document management operation request, by the XDMS;

determining that the identity identifier of the XDMC sending the XML document management operation request does not match the identity identifier of the owner of the XML document, by the XDMS.

2. The method according to claim 1, wherein the process of obtaining, by the XDMS, the identity identifier of the XDMC sending the XML document management operation request in accordance with the XML document management operation request comprises:

obtaining the identity identifier of the XDMC from X-3GPP-Asserted-Identity or X-3GPP-Intended-Identity in the XML document management operation request in a 3GPP IMS network provided with a GAA mechanism, by the XDMS;

otherwise obtaining the identity identifier of the XDMC from the X-XCAP-Asserted-Identity in the XML document management operation request.

3. The method according to claim 1, wherein the access permission information comprises an identity identifier, an action field and an operation type field; and the process of determining whether to perform an operation described in the XML document management operation request in accordance with access permission information corresponding to an XML document comprises:

determining whether to perform the operation requested by the XDMC in accordance with the action field and the operation type field corresponding to the identity identifier of the XDMC sending the XML document management operation request, wherein the action field and the operation type field are obtained from the access permission information.

4. The method according to claim 3, wherein the action field corresponding to each identity identifier in the access permission information comprises at least one of allowing, denial and required confirmation;

the operation type field corresponding to each identity identifier comprises at least one of:

a read operation, a creation operation, a modification operation, a deletion operation, a search operation, a suspense operation, a recovery operation and a subscription operation.

5. The method according to claim 3, wherein the access permission information further comprises information specifying a specific part of the XML document on which the operation is permitted; the method further comprises:

performing the operation on the specific part of the XML document corresponding to the XML document management operation request in accordance with the information specifying a specific part of the XML document on which the operation is permitted, by the XDMS, wherein the specific management operation on the XML document comprises at least one of:

a read operation of HTTP GET, a write operation of HTTP PUT, a deletion operation of HTTP DELETE, and a search operation of HTTP POST.

6. The method according to claim 5, wherein the specific part of the XML document is represented with an XPATH expression.

7. The method according to claim 1, wherein the XML document management operation request carries an entrustment identifier, and the process of determining of that the XML document management operation request is in an entrustment mode comprises:

determining that the XML document management operation request is in an entrustment mode in accordance with the entrustment identifier, by the XDMS.

8. The method according to claim 1, further comprising: setting the access permission information corresponding to the XML document on the XDMS via the XCAP protocol in advance, by the XDMC.

9. An Extensible Markup Language (XML) document management system, comprising:

an XML document management operation entrustment checking element, adapted to receive an XML document management operation request sent via an XML Configuration Access Protocol (XCAP) protocol, and determine that the XML document management operation request is in an entrustment mode, the entrustment mode allowing a client to entrust its management operation on an XML document to another client;

a processing element, adapted to perform an operation described in the XML document management operation request in accordance with access permission information corresponding to an XML document, wherein the access permission information is stored in an XML document of the XDMS;

wherein the process of determining that the XML document management operation request is in the entrustment mode comprises:

obtaining an identity identifier of an XML Document Management Client (XDMC) sending the XML document management operation request and the identity identifier of the owner of the XML document, in accordance with the XML document management operation request, by the XDMS;

determining that the identity identifier of the XDMC sending the XML document management operation request does not match the identity identifier of the owner of the XML document, by the XDMS;

wherein the XML document management operation entrustment checking element and the processing element include a transmitter to transmit messages and a receiver to receive messages.

10. The system according to claim 9, further comprising:

an XML document management server, adapted to determine whether a specified entity is provided with a privilege of performing an XDM operation on the XML document in accordance with access permission information of the XML document whose access permission information is set in the system.

11. The system according to claim 10, wherein the XDMS authenticates an operation request sent from an XDMC other than the owner of the XML document in accordance with the access permission information of the XML document and determines whether to perform the operation requested by the XDMC.

12. The system according to claim 9, wherein the XML document management operation entrustment checking element and the processing element are provided in the XDMS, and the function of validating whether an XML document operation requested by the XML Document Management Client is in an authorized entrustment mode includes: checking whether the identity identifier of the XDMC sending an XML document management operation request is the owner of the document on which the operation is requested, and determining whether the requested XML document operation is in an authorized entrustment mode; and determining whether the operation request has been authorized in accordance with access permission information of a target document.

13. An Extensible Markup Language (XML) document management server, comprising:
   a checking element, adapted to receive an XML document management operation request sent via an XML Configuration Access Protocol (XCA)1 protocol, and determine that the XML document management operation request is in an entrustment mode, the entrustment mode allowing a client to entrust its management operation on an XML document to another client, whereinthe process of determining that the XML document management operation request is in the entrustment mode comprises:
      obtaining an identity identifier of an XML Document Management Client XDMC sending the XML document management operation request and the identity identifier of the owner of the XML document, in accordance with the XML document management operation request, by the XDMS;
      determining that the identity identifier of the XDMC sending the XML document management operation request does not match the identity identifier of the owner of the XML document by the XDMS;
   a processing element, adapted to perform an operation described in the XML document management operation request in accordance with access permission information corresponding to an XML document, wherein the access permission information is stored in an XML document of the XDMS;
   wherein the checking element and the processing element include a transmitter to transmit messages and a receiver to receive message.

* * * * *

UNITED STATES PATENT AND TRADEMARK OFFICE
CERTIFICATE OF CORRECTION

PATENT NO. : 8,812,696 B2
APPLICATION NO. : 11/969603
DATED : August 19, 2014
INVENTOR(S) : Bao et al.

Page 1 of 1

It is certified that error appears in the above-identified patent and that said Letters Patent is hereby corrected as shown below:

In the Claims

Claim 13, column 17, line 25, "(XCA)1" should read -- (XCAP) --.

Claim 13, column 18, line 7, "XDMC" should read -- (XDMC) --.

Claim 13, column 18, line 24, "message" should read -- messages --.

Signed and Sealed this
Sixth Day of January, 2015

Michelle K. Lee
*Deputy Director of the United States Patent and Trademark Office*